US008572863B2

(12) United States Patent
Wiesmeier et al.

(10) Patent No.: US 8,572,863 B2
(45) Date of Patent: Nov. 5, 2013

(54) CHUTE DRYER WITH SPECIAL AIR-ROOF ASSEMBLY

(75) Inventors: Franz Wiesmeier, Beilngries (DE); Andreas Ehrhardt, Klumbach (DE)

(73) Assignee: Schmidt-Seeger GmbH, Beilngries (DE)

( * ) Notice: Subject to any disclaimer, the term of this patent is extended or adjusted under 35 U.S.C. 154(b) by 1262 days.

(21) Appl. No.: 12/377,890

(22) PCT Filed: Jun. 23, 2008

(86) PCT No.: PCT/EP2008/057965
§ 371 (c)(1), (2), (4) Date: Feb. 18, 2009

(87) PCT Pub. No.: WO2009/000812
PCT Pub. Date: Dec. 31, 2008

(65) Prior Publication Data
US 2011/0047810 A1 Mar. 3, 2011

(30) Foreign Application Priority Data
Jun. 22, 2007 (DE) ......................... 10 2007 028 781

(51) Int. Cl.
*F26B 25/06* (2006.01)
*F26B 17/12* (2006.01)
*A01F 12/44* (2006.01)
*A01F 12/32* (2006.01)

(52) U.S. Cl.
USPC .................. 34/225; 34/201; 34/168; 460/84; 460/101

(58) Field of Classification Search
USPC ........... 34/359, 201, 226, 225, 168, 170, 177, 34/174; 460/84, 79-81, 85, 101
See application file for complete search history.

(56) References Cited

U.S. PATENT DOCUMENTS

| | | | | |
|---|---|---|---|---|
| 1,623,553 | A | 4/1927 | Randolph | |
| 2,407,636 | A | 9/1946 | Engler et al. | |
| 3,645,006 | A * | 2/1972 | Anderson | 34/443 |
| 4,479,309 | A * | 10/1984 | Tolson | 34/394 |

(Continued)

FOREIGN PATENT DOCUMENTS

| | | | |
|---|---|---|---|
| DE | 31 00 614 | A1 | 11/1981 |
| DE | 88 05 479 | U1 | 6/1988 |

(Continued)

OTHER PUBLICATIONS

Abstract of Delmas, Calixte, FR2646749A1, Nov. 1990.*

(Continued)

*Primary Examiner* — Kenneth Rinehart
*Assistant Examiner* — John McCormack
(74) *Attorney, Agent, or Firm* — Hamre, Schumann, Mueller & Larson, P.C.

(57) ABSTRACT

A drying method is provided through a particular arrangement of air intake- and air exhaust roofs, wherein the particular material flows are not only impacted by intake air in an alternating manner from the left and from the right, but also an accumulation of air intake roofs and air exhaust roofs is avoided, which otherwise typically occurs at the separation plane between two chute modules, rotated relative to one another by 180°, which is performed for changing the side of the air impact. This method is advantageous in particular for drying parboiled rice.

21 Claims, 12 Drawing Sheets

(56) References Cited

U.S. PATENT DOCUMENTS

Figure 1A:
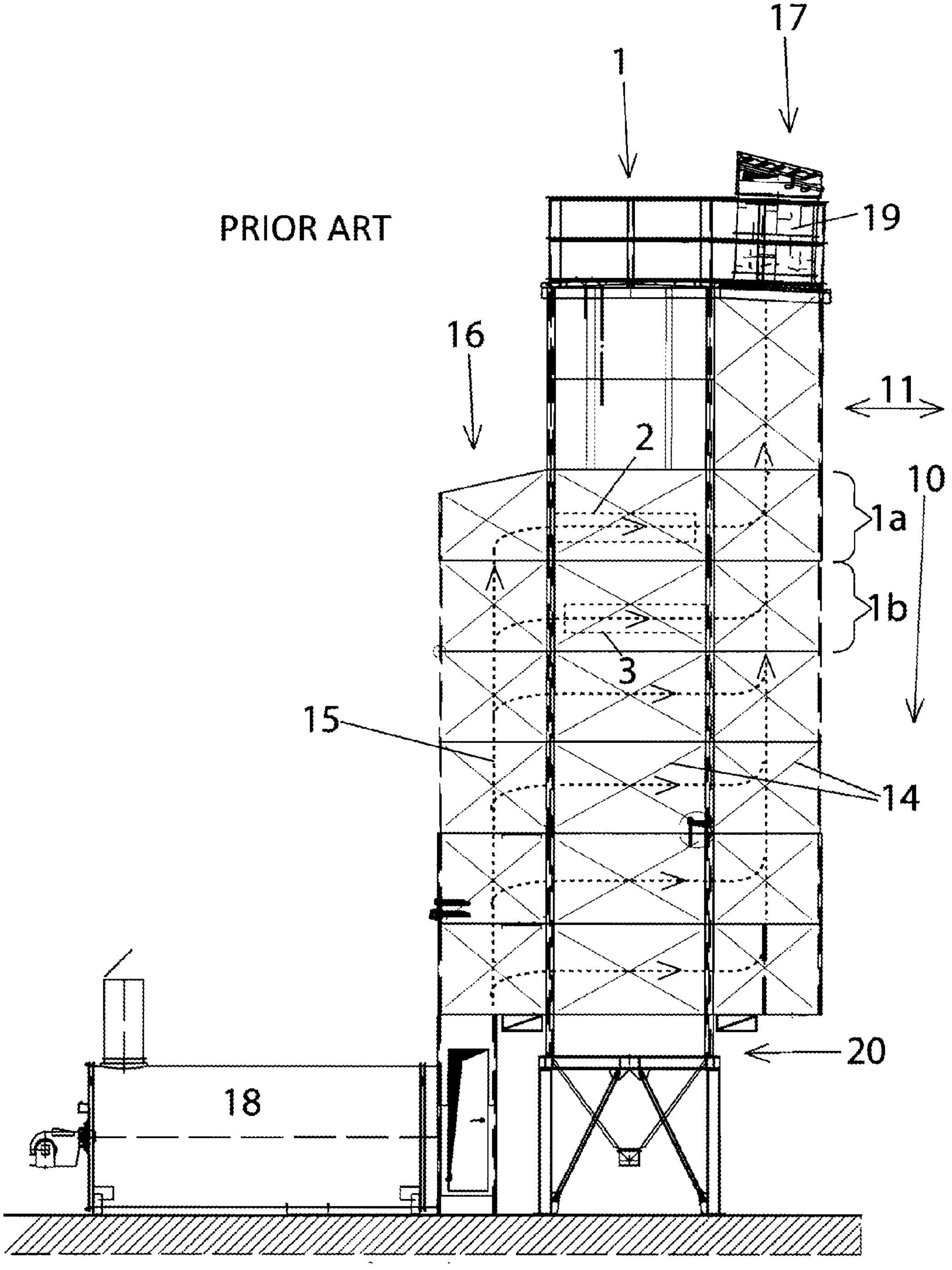

| | | | | | |
|---|---|---|---|---|---|
| 4,486,960 | A | * | 12/1984 | Maurice et al. | 34/64 |
| 4,750,276 | A | * | 6/1988 | Smith et al. | 34/612 |
| 5,142,794 | A | | 9/1992 | Meiners | |
| 5,794,358 | A | * | 8/1998 | Robertson | 34/172 |
| 2004/0194337 | A1 | * | 10/2004 | Gasparini et al. | 34/576 |
| 2009/0158610 | A1 | * | 6/2009 | Bonner et al. | 34/171 |

FOREIGN PATENT DOCUMENTS

| | | | | |
|---|---|---|---|---|
| DE | 94 07 184 | U1 | | 8/1994 |
| DE | 295 08 283 | U1 | | 8/1995 |
| DE | 20 2004 002 640 | U1 | | 5/2004 |
| EP | 0 339 196 | A2 | | 11/1989 |
| FR | 822 311 | A | | 12/1937 |
| FR | 892 173 | A | | 3/1944 |
| FR | 991916 | A | | 10/1951 |
| FR | 2 475 350 | A | | 8/1981 |
| FR | 2475350 | A | * | 8/1981 |
| FR | 2 556 458 | A1 | | 6/1985 |
| FR | 2 646 749 | A1 | | 11/1990 |
| FR | 2646749 | A1 | * | 11/1990 |
| FR | 737 017 | A | | 12/1992 |
| FR | 2 693 347 | A1 | | 1/1994 |
| GB | 382075 | A | | 10/1932 |
| GB | 492178 | A | | 9/1938 |

OTHER PUBLICATIONS

Engilsh Description of Delmas, Calixte, FR2646749A1, Nov. 1990.*

International Search Report of PCT/EP2008/057965, dated Feb. 2, 2009.

* cited by examiner

PRIOR ART

CHUTE DRYER WITH SPECIAL AIR-ROOF ASSEMBLY

I. FIELD OF THE INVENTION

The invention relates to chute dryers for bulk materials, e.g. grain.

II. TECHNICAL BACKGROUND

The bulk material sinks downward in the chute due to gravity with a velocity which is controlled by how much bulk material is continuously removed at the bottom end of the chute.

On its way from the top to the bottom, the bulk material runs between a plurality of approximately horizontal and mostly parallel so-called air roofs, which are disposed in horizontal planes and which cover the chute from one lateral wall to the other lateral wall and which comprise an open bottom like a roof. The bulk material is thereby divided into particular flows running next to one another.

In addition, one of the faces of each roof is open, so that air can get into the roof through said open side, and can thus be blown into the chute or sucked into the chute, wherein the air is dry and mostly heated. Said roofs are called air intake roofs.

The other roofs, the so-called air exhaust roofs, on the other hand, are connected with their open face to an air exhaust duct, the so-called air exhaust plenum, so that the air which is enriched with moisture from the material to be dried and also the typically cooled down exhaust air can be exhausted. Thus, the air absorbs moisture from the drying material on its way from an air intake roof to an air exhaust roof in a transversal direction through the drying material.

Typically in top view of a drying chute, all air intake roofs are connected by an air intake plenum, which extends on one side of the drying chute over the entire height or over a partial portion of the height in vertical direction from the bottom to the top, and all air exhaust roofs are connected by an air exhaust plenum, which is disposed on the opposite side of the chute, and which also extends in vertical direction from the bottom to the top.

Since in particular the disposition of the air intake roofs and of the air exhaust roofs within the chute is of great importance e.g. for the evenness of the drying result, and in particular for the energy consumption associated therewith and for the drying time, it was already attempted in the past to optimize this arrangement, wherein the particular roofs are typically disposed in horizontal planes located on top of one another.

Thus, it is also important that the drying chute itself, this means its outer shell, together with the support frame and the installed equipment, like e.g. the air roofs, is comprised of plural modules placed on top of another, mostly made of steel sheet material, stainless steel or aluminum, which are placed on top of another and which can thus be assembled quickly, since the air roofs are already preinstalled in the modules in said locations.

In a first state of the art embodiment, the air roofs are disposed directly below one another in vertical direction, this means not offset relative to one another in the particular planes, so that one plane only includes air intake roofs, and the next plane only includes air exhaust roofs.

The disadvantage of this embodiment is that the bulk material piles up on the particular roofs but runs downward in between rather quickly and that the retained material is either overheated or is not dried or is only dried when the chute is completely emptied, so that an uneven drying result is accomplished.

In a second known embodiment, the air roofs are not disposed directly below one another in vertical direction, but offset relative to another in lateral direction, so that a roof is disposed respectively under the gap between the roofs of the next plane above, this means in a diamond pattern comprising only slanted pattern lines.

Thus, in one plane, only air intake roofs are installed and in the next plane below only air exhaust roofs are installed, etc.

The advantage of this configuration is that the bulk material thus runs from the top to the bottom in particular in meandering material flows, and no retaining zones are formed.

The disadvantage of this configuration is that the air only flows through a vertical partial flow of the bulk material on its path from one air intake roof to the most proximal roof only from one side, which yields uneven drying action of the bulk material within said material air exhaust roof, since the drying effect on the side of the partial flow facing the air intake roof is higher through the air, which is still warm and dry, than on the side of the material flow facing away from the air intake roof and facing the air exhaust roof.

Figure 1B:
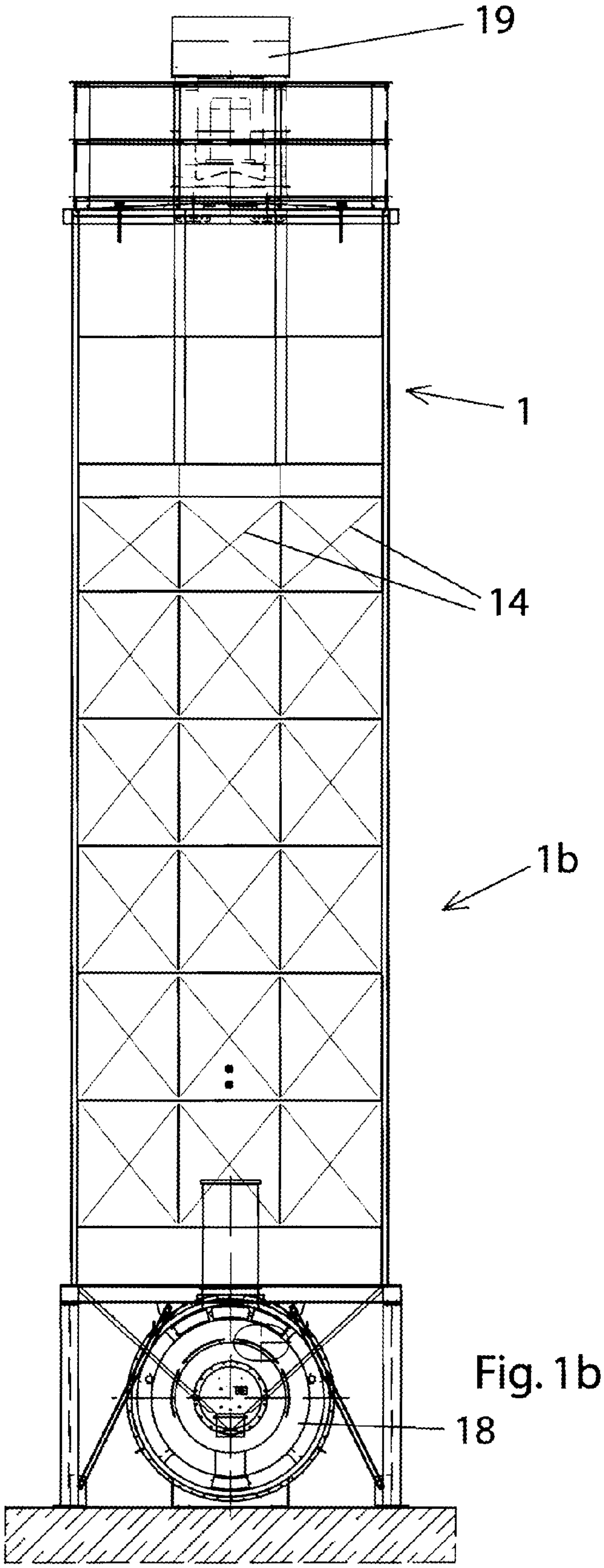
Figure 1C:
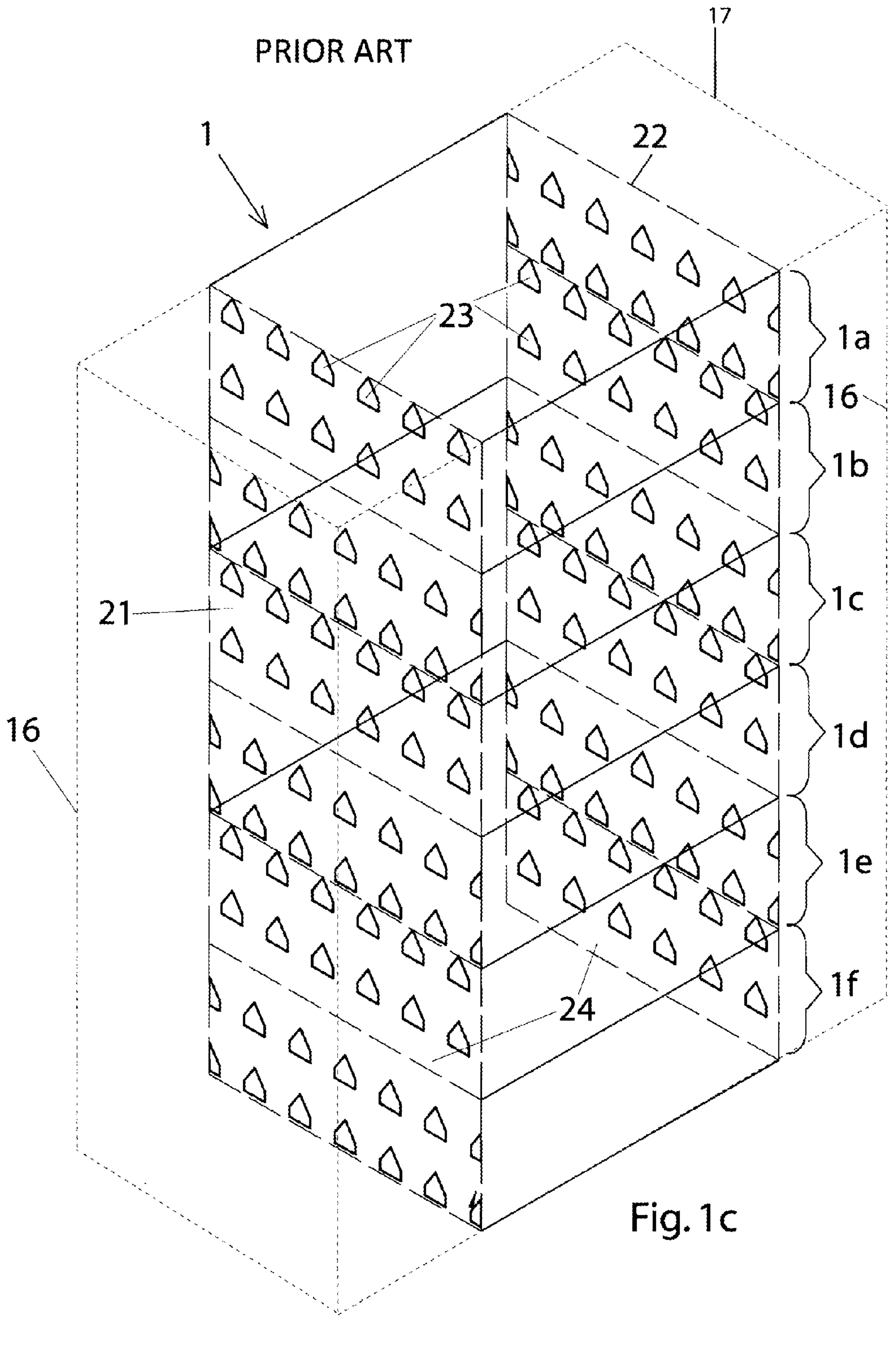

A third known embodiment as described in FIG. 1*c* avoids said disadvantage by mounting the particular identically configured modules viewed in top view by 180° rotated relative to one another.

When a respective even number of planes is disposed within the modules, this induces the flow direction of a partial material flow to remain constant within a module, however, the flow direction of the partial flow to change from one side to the other at the transition from one module to the next.

The disadvantage of this solution is that an accumulation of air exhaust roofs or air intake roofs occurs at each separation plane between two modules, since the two adjacent roof modules respectively comprise the same type of roofs above and below the horizontal joint between two modules, while the type of roofs changes respectively from the top to the bottom, thus in the sequence of the planes in the interior of a module.

This leads to an uneven airflow in the boundary portion between two modules, which is greatly reduced compared to the desired medium air velocity in a boundary portion, and greatly increased in the other one.

The increased air velocity thus would lead to an increased removal of small and light components of the bulk material, in case of grain e.g. broken kernels, in case of canola e.g. canola seeds, which typically constitutes an undesirable loss of mass, so that for this reason the overall set velocity of the intake air and of the exhaust air has to be reduced.

In order to arrive at the same drying result, thus the size, in particular the diameter, of the chute has to be increased, which increases cost.

III. DESCRIPTION OF THE INVENTION a) Technical Object

Thus, it is the object of the invention to provide a chute dryer with air roofs installed therein, which facilitates an optimum compact and low volume configuration, while providing even drying and low energy consumption. It is another object of the invention to provide a drying method which dries in particular rice and all other cereals and granulates and free-flowing bulk materials in an optimum manner.

b) Solution

With respect to the configuration of the chute dryer, it is accomplished by the configuration of the air roofs as described in patent claim 1 that, in addition to the alternating flow direction towards the material flow from the left and from the right at the transition between the modules, the deviation of the flow velocity of the drying air form the mean value through an accumulation of one type of air roofs in the boundary portion between two modules is avoided.

When the alternating arrangement of the air roofs is additionally performed on the one diagonal line in an even manner, and in particular, when an air exhaust roof directly follows after each air intake roof along said diagonal line, accumulations of air intake- or air exhaust roofs at the border line between two modules are completely avoided.

When the air roofs additionally comprise a cross section, which decreases from the open side to the closed side, e.g. the distribution of the air flowing into the air intake roof along the length of the air intake roof is optimized with respect to the exhaust into the drying material, and thus the evenness of the drying is facilitated.

Thus, when the cross section continuously increases, additionally a simplified production of said air roofs is provided, since they can be produced as sheet metal components through simple punching or other separation methods and subsequent bending, this means without any complexity for assembling from several components or even welding within one of the air roofs.

Since the modules comprise an even number of planes with air roofs on top of one another, and in particular all modules comprise the same number of planes, on the one hand, the effort for production and possibly also for stocking supplies is reduced, and an accumulation of one type of roofs in the border portion between modules, when assembling the modules into a chute dryer, is still avoided, when the modules are respectively placed on top of one another in the same orientation without a relative rotation of 180°.

Through the even alternating sequence of air intake- and air exhaust roofs in a single plane next to one another, wherein in particular an air exhaust roof follows upon each air intake roof directly next to it, the same effect is accomplished when offsetting the roofs in the particular planes, disposed below one another respectively by half an air roof distance, as by the previously described sequence along the diagonal lines.

The offset by respectively half an air roof distance from plane to plane has the effect that the air roofs of the respective same type are disposed vertically exactly above one another.

However, in this manner, the material flow, which meanders from the top to the bottom, substantially remains constant, thus comprises the composition, so that always the same kernels move in the outer portion of the material flow or in the center portion of the material flow, which is accessible for the air with more difficulty.

When an offset is chosen instead from one plane to the next, e.g. at the transition from one module to the next, wherein said offset does not exactly correspond to half the air roof distance within a plane, thus thereby the material flow, which was meandering up to this point, but substantially ran downward undivided, is being divided, and the partial flows generated from said material flow are combined into a new material flow.

When the additional offset, which is performed at said location, amounts to half the width of the material flow, thus e.g. a quarter of a horizontal air roof distance, thus, hereby the existing material flow is divided in the middle, and the two partial flows, which have approximately the same width, are combined into a new material flow.

This has the effect that the kernels, which were in the outer portions of the material flow in the original material flow, are now positioned in the center of the new material flow, and vice versa, those kernels, which were positioned in the center of the original material flow, are now positioned in the outer portions of the new material flow.

If there were differences over the width of the original material flow with respect to the moisture content of the kernels, viewed over the cross section of the material flow, e.g. an increased humidity towards the center of the material flow, thus exactly this disposition is balanced after recombining the partial flows, since then the kernels from the original center with the high moisture content are now situated on the outside in the new material flow, and are thus impacted at first by the incoming drying air, which is still very dry, so that these kernels are dried particularly well.

Instead of an additional offset by half the width of the material flow, this offset can also be a smaller additional offset, and can in turn be repeated several times over the height of the dryer, then, however, preferably always in the same direction, so that the sum of the additional offset distances over the height of the dryer corresponds entirely or approximately to the width of a complete material flow.

Preferably, said additional offset is obtained by all roofs within a module comprising said additional offset relative to the roofs of the preceding module, which is disposed above, so that within a module the air roofs of the same type are still vertically aligned exactly above one another.

Furthermore, a continuous flow and thus even drying by the chute dryer can be improved by the exhaust slides being cambered in a convex manner towards the interior of the dryer, or a cover plate thus formed, thus cambered or angled and bent upward, is placed onto the flat exhaust slide.

In order to minimize the energy consumption, the heat transfer of the outer walls of the chute dryer to the ambient can be minimized, either only by two-shell construction of the outer skin, thus two-layer covering, or by an insulation of the outer fairing, e.g. by mineral wool or through a combination of both measures, whereby the insulation material is then disposed in the free space between both cover layers, which are comprised e.g. of sheet metal plates.

Furthermore, heat recovery can be performed for reducing the energy consumption during drying by extracting at least part of the heat from the drying air enriched with moisture through the bulk material before exhausting it to the ambient, and transferring it directly or indirectly into the newly ingested ambient air, which is going to be used for drying, e.g. through heat exchangers, in particular glass tube heat exchangers.

Providing so-called sweat zones in the process, in particular in the lower portion of the drying chute, is also used for saving energy.

These are either zones in which no active drying is performed, so-called pass-through temper cells, which are free from air roofs, and which are passed through by bulk material evenly on the entire cross section surface from the top to the bottom, for which a respective pass-through time is required, which is controlled by the pass-through velocity, and an exhaust, which is effective over the entire cross section surface.

Said pass-through time, the so-called dwell period, is used to equalize the kernels, which are heated to different temperatures, and to equalize their different moisture contents in particular also from the interior of the kernel relative to the exterior of the kernel due to the dwell time and due to the mutual contact of the kernels and the heat transfer caused thereby.

In particular, thereby, also the moisture content, which is still higher in the core portion of the kernel, is equalized, so that the moisture, which is still present in the interior, migrates to the exterior and to the surface of the kernel, caused e.g. by the existing relatively high temperature in the kernels of e.g. 60° to 70°.

Said moisture, which is thereafter present e.g. at the surface of the kernels, can be removed by the air roofs following after the tempering zone with a relatively small energy consumption by using air with ambient temperature in these subsequent air roofs for further drying, this means without additionally having to heat said air, since already the relatively cool ambient air suffices for removing said surface moisture from the kernels. Such modules are called pass-through coolers and can be components of a vertical drying chute, like the tempering cells, or they can be separate modules between plural dryers in a process.

By this measure alone, the average moisture of the bulk material can be reduced by another 2% without having to go through the effort of heating the ambient air from e.g. 20° C. to 50° C. or 80° C.

The drying process, on which the invention is based, works by impacting the particular material flows on their way from the top to the bottom in an alternating manner, one time from the left and another time from the right with drying air, while additionally exhausting the drying air, inducted by the intake air roofs of one plane through exhaust air roofs, which are disposed in the plane located directly above or below, so that no accumulation of intake air roofs or exhaust air roofs occurs between two subsequent planes.

This certainly does not apply for the upper most plane and the lower most plane of a chute dryer, where there is no subsequent plane at all in upward or in downward direction.

Thereby, among other things, turning over the material flows by so-called product turnover devices in the chute dryer is avoided, wherein these turnover devices always pose an additional flow resistance, and thus increase the risk of product damming and eventually constipation in the dryer.

Additionally, but also independently, from the even flow exposure from the left and from the right of the material flows, the additional single or multiple flow division of the material flow on the path from the top to the bottom leads to the advantages described supra of a new composition of the material flows viewed over their cross sections.

Through the above described drying methods and also through the above described configuration of a respective chute dryer, specific drying techniques, in particular drying so-called paddy rice, thus the rice grains with their husks, in particular in the processing states, raw paddy, steamed paddy, parboiled paddy, can be simplified and optimized.

The rice grain, which is still complete after the harvest (the so-called raw paddy), is comprised of the flour kernel, which is typically sold eventually, which is covered by a so-called silver pellicle, which in turn is enveloped by the actual shell, the so-called husk.

After removing the husk, the so-called brown rice is produced, in which the silver pellicle is still present. Said pellicle is typically removed when polishing the brown rice, which makes it white and ready to sell.

This, however, has the disadvantage that the positive contents primarily included in said silver pellicle are lost.

This exactly is to be at least partially avoided by the so-called parboiled method, in which the paddy, which typically arrives from the field with a moisture content of 22% by weight, is soaked in water and cooked in particular with the addition of vapor or only by means of vapor.

Thereby, the content materials are dissolved primarily from the silver pellicle, and diffuse at least partially also into the flour kernel. The subsequent cooking time is shortened and the portion of broken kernels is reduced.

Certainly, also the moisture content is greatly increased by this process, when soaking and cooking e.g. from 22% to 32%, with the consequence that subsequently a drying of said parboiled paddy has to be performed very quickly, in order to prevent mildew and other rot. Peeling the paddy can be performed only after said drying process.

In the state of the art, the drying is either performed by circulation drying or by pass-through drying.

In circulation drying, only a circulation dryer is connected after the cooking unit, which, however, has to be large enough so that it can absorb the entire batch of parboiled paddy, and said batch is permanently dried in the circulation dryer until the drying material has reached the desired final moisture of generally 13% by weight, for which typically approximately 4 hours are required.

Accordingly, at the beginning of the drying process, elevated temperatures of the drying air of approximately 110° C. are used, since the material to be dried still has about 90° C. due to the cooking process.

Subsequently, the temperatures of the drying air come down, so that the operation continues at approximately 20% residual humidity in the material to be dried at 50° to 60° C. drying air temperature.

During pass-through drying, several dryers are being used one after the other, which are passed through by the drying material, and between the dryers so-called temper cells are provided, in which the drying material only rests while substantially holding its temperature, whereby moisture differences within the material flows and also within the particular kernels shall be balanced.

Accordingly, the throughput power is high, but in particular the investments due to plural dryers, mostly chute dryers, and the temper cells necessary there between, which are also implemented in the form of chute shaped vertical silos, are also high.

Additionally, the entire materials handling equipment is necessary for passing the material from one element to the next.

Thus, there is the basic problem, in particular when drying rice, that rice develops cracks when dried too quickly, which causes the respective rice kernels to break during the subsequent transport or handling, so that they then have to be discarded as low quality scrap material, which reduces the yield.

While the center values of a drying process can be controlled so that a strong drying or heating is avoided, this cannot be completely avoided due to the deviation from these medium values in practical applications in the particular portions of the material flows, e.g. the outer portions.

A scrap rate of approximately 3% due to too strong drying is thus viewed as a good result for the time being.

Another method for processing paddy is steaming, in which the paddy without steam soaking is precooked in particular only by steam.

Also, said steamed paddy, which in turn primarily is supposed to improve the cooking properties, subsequently has to be dried down before peeling in one to three drying steps, in particular as described with reference to the parboiled method.

When in particular the parboiled or steamed paddy is dried, using the drying method according to the invention, and in particular using a chute dryer configured according to the invention, in particular with a prepositioned chute dryer, in particular due to the even flowing of the material flows with drying air from the left to the right, an even drying of the paddy rice is obtained, so that the scrap through particular kernels, which are over dried, can be held below 3%, and/or the energy—and investment requirement compared to the state of the art drying methods is significantly reduced.

By using the chute dryers/drying methods according to the invention, at least one chute dryer with the associated tempering cells is saved in comparison to the otherwise e.g. three provided chute dryers with temper cells disposed there between, which are used in the pass-through method, which significantly reduces the investment requirement.

The state of the art circulation method is not really competitive in this sense, since due to the dwell time of approximately 4 hours in the circulation dryer, a rhythm of batch processing of 4 hours is forced, though the actual cooking or steaming process of the rice would only require a short period of time.

In order to still obtain a large pass-through velocity in the entire process, a multiple arrangement of the pass-through dryers would be possible for this purpose, which in turn would multiply the required investment.

Even if drying the parboiled rice were not possible by means of a single chute dryer/drying method according to the invention in the chute dryer, and thus two such dryers are required behind one another, the efficiency can be increased once more, though the investment requirement has already been reduced, by not only performing a balancing of temperature and moisture in the temper cells there between, but by additionally performing a loading with drying air at ambient temperature and without additional heat up of said cooling air in a pass-through cooler.

On the one hand, thereby the moisture diffused from the interior of the kernels to their surface is removed with little energy use by moving the ambient air in the pass-through cooler only through the drying material without having to heat it.

On the other hand, hereby the drying material is also cooled with the consequence that the drying air has to be heated to a lower temperature in the subsequent drying stage, since the temperature of the drying air always has to be above the temperature of the drying material by a certain extent.

However, a significant heat up of the drying material only occurs below 20% residual humidity, thereafter the evaporation cooling of the evaporated liquid keeps the temperature of the material to be dried approximately constant.

EMBODIMENTS

Embodiments according to the invention are subsequently described in more detail in an exemplary manner, showing in:

FIG. 1 a known chute dryer in the two-side views;

FIG. 2 the arrangement of the air roofs according to the invention;

FIG. 3 an air roof in detail; and

FIG. 4 the exhaust portion of the dryer chute.

The FIGS. 1*a* and *b* illustrate a known basic configuration of a chute dryer in two-side views, offset by 90°.

The function of a chute dryer is evident from FIG. 1*a:*

Thus, the dryer chute 1 is disposed in the center of the tower type chute dryer, in which the material to be dried, e.g. grain, is disposed, and wherein it migrates therein slowly from the top to the bottom while being dried, wherein the pass-through velocity depends on the volume per unit time removed at the exhaust unit 20 at the lower end of the dryer chute 1.

In order to be able to directly load materials handling equipment with drying material from the exhaust unit 20, the entire dryer chute 1 is placed on stands, so that materials handling equipment can be installed under the exhaust unit 20.

The material to be dried is dried in the dryer chute 1 by drying air flowing through, which is heated by a hot air generator 18 and which is inducted into the dryer chute 1 by an air intake manifold module 16, which is mounted as a housing, conducting drying air at the one outside of the dryer chute 1, substantially e.g. over its entire height. From there, it flows on the opposite side, and after the material to be dried has run through, the air flows through an exhaust air manifold module 17, which is in turn mounted to the dryer chute 1 like a housing, into said housing and is collected therein, and is released by an exhaust air fan 19, entirely or partially into the ambient. Before that, energy can be removed from the exhaust air, which is mostly still warm, through a heat exchanger, which is not shown, or the exhaust air is partially mixed into the intake air in a cycle, possibly after a reheat.

From the air intake module 16, the drying air 15 reaches the drying chute 1 through air guide elements, e.g. so-called air intake roofs 2, one of which is illustrated in FIG. 1 in an exemplary manner. These are roof shaped sheet metal elements which are open on the bottom and which are attached on the intake side at respective connection openings in the front wall 21 of the drying chute 1 towards the air intake module 16, wherein said sheet metal elements are open and supplied with intake air 15 from there and are closed at the opposite face, e.g. by the rear wall 22, disposed in this location.

The drying air exits from the bottom side of the air intake roof 2 and flows through the material to be dried and is received again by the air exhaust roofs 3, which are analogously formed and which are attached with one open face at the rear wall 22 on the exhaust air side of the chute dryer 1 with pass-throughs disposed thereon, and which are closed on the face side on the air intake end, e.g. by the front wall 21.

Out of these air intake- and air exhaust roofs 2, 3, a plurality is disposed on top of one another and next to one another as described in more detail with reference to the FIG. 2.

As it is shown furthermore in the FIG. 1, the entire tower assembly of the chute dryer, which is typically a steel structure, is assembled from modules 1*a, b* placed on top of another, wherein already within one of the modules 1*a, b* plural levels of air roofs 2, 3 are disposed on top of another.

In FIG. 1*a*, the chute dryer 1 is illustrated from the side of the hot air generator 18, which makes it evident that the air intake module 16 and the air exhaust module 17 are respectively disposed only on one of the four sides of the typically rectangular dryer chute 1.

In the two side views from the outside, only the covering 14 of the chute dryer, thus of the dryer chute 1 and of the air modules 16 and 17, is visible, which are typically comprised of a sheet metal covering, which comprise diagonal creasing to improve stability, or also are braced by tension wire.

Different from the schematic in FIG. 1*a*, the air intake- and air exhaust roofs extend continuously from the air-intake-side front wall 21 to the air-exhaust-side rear wall 22 of the chute dryer 1, and are mounted to them with their respective faces. The face side closure on the respective one side of the air roofs is generated by the respective front wall 21 or rear wall 22 comprising no pass-through openings for the drying air, but only the hole pattern 24, which is also visible in FIG. 2*a*, through which the face sides of the air roofs are bolted together with the respective wall 21, 22 of the dryer chute 1.

Each module 1*a, b* . . . of the dryer chute 1 is thus comprised of four plates, disposed in a square and bolted together, thus the front wall 21, the rear wall 22 respectively configured with pass-through openings 23 and hole patterns, as well as the side walls mounted there between, which are continuously closed.

The dryer chute 1 is created by modules 1*a, b* . . . placed on top of one another, which should be identical at least with respect to spare parts, in order to minimize manufacturing complexity.

The air roofs 2, 3 are disposed within the dryer chute 1 and also within the particular modules 1*a, b* in horizontal planes 4*a, b* above one another.

Figure 2A:
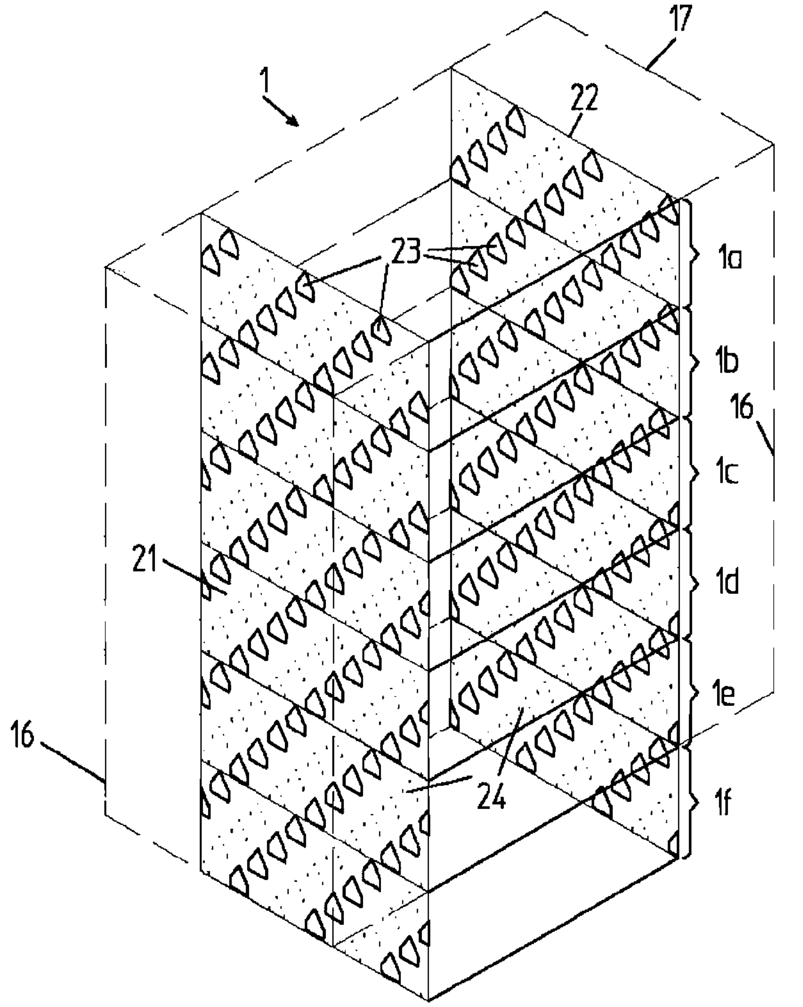
Figure 2B:
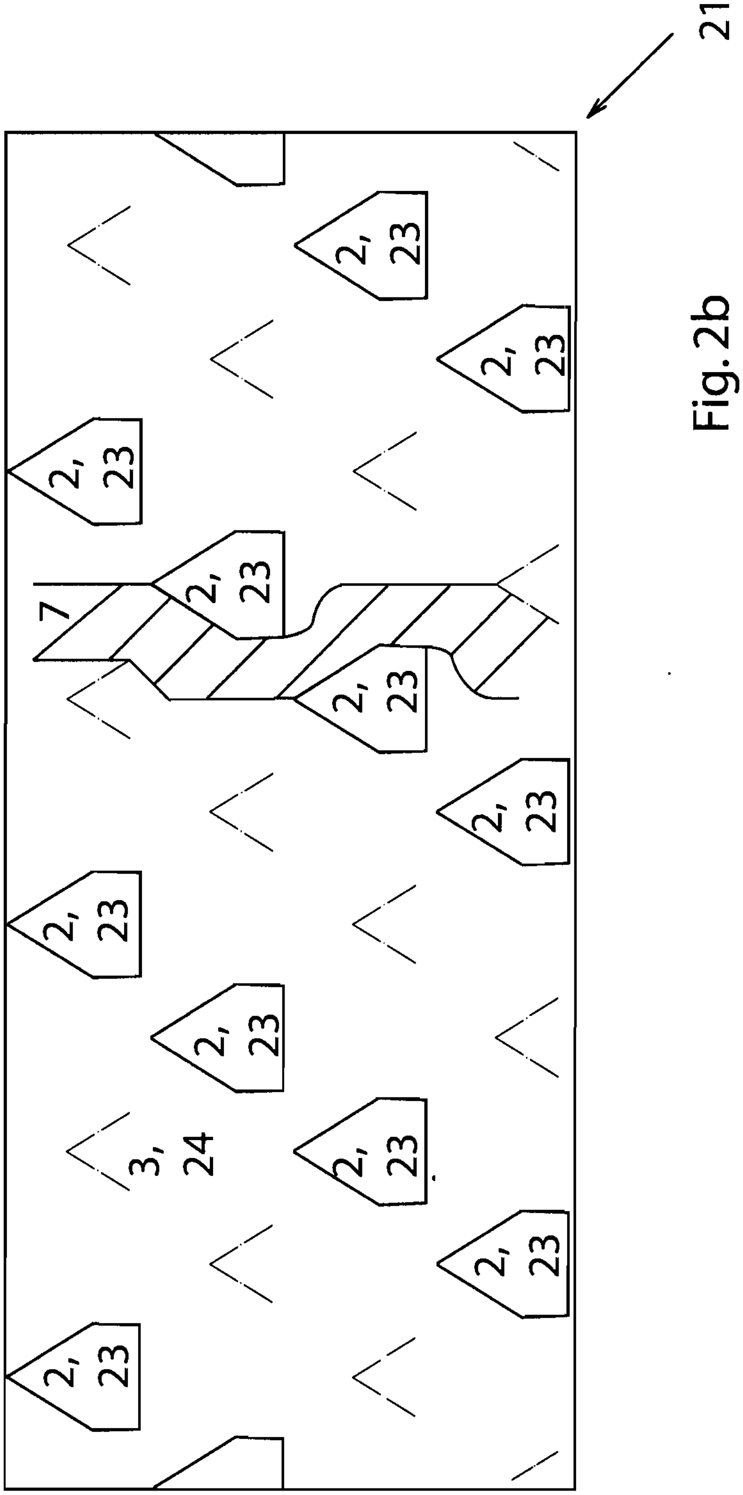

FIG. 2*b* shows such front wall 21 in flat projection, thus including the rim side chamfers 25, 26 for bolting to the continuously closed side walls.

The plural front walls 21, which are disposed on top of one another show the arrangement of the pass through openings 23, behind each of which one respective air intake roof 2 is attached, towards the array of the hole patterns 24, behind each of which a respective air exhaust roof 3 is disposed, and show thus the disposition of the air intake roofs 2 relative to the air exhaust roofs 3, which is visible in the perspective view also in FIG. 2*a*.

Thus, it is evident, that the air intake roofs 2 and the air exhaust roofs 3, which are disposed in particular horizontal planes 4*a, b* above one another, are typically distributed within said planes 4*a, b*, so that a diagonal pattern is created in the side wall top view, wherein the diagonal lines 5, 6 of said pattern respectively intersect in an air roof 2, 3.

On the one type of diagonal lines 5, respectively only one type of air roofs (air intake roof 2 or air exhaust roof 3) is disposed, and this is the case respectively in particular in an alternating manner for the diagonal lines 5 following one after the other.

On the diagonal lines 6 of the other direction, air intake/exhaust roofs 2, 3 of both types are disposed in an alternating manner; in particular a respective air intake roof 2 is disposed subsequent to an air exhaust roof 3.

The air roofs of a plane, e.g. 4*a*, thus due to the opposed identical inclination of the diagonal lines 5, 6, are thus disposed exactly above or below the horizontal plane, which is below or above the next horizontal plane, e.g. the plane 4*c* of roofs.

Since each module 1*a, b* comprises an even number of planes 4*a, b* . . . of roofs, in this case four planes, the particular modules 1*a, b*, and thus their front walls 21 and their rear walls 22 can be configured identically for this typical situation.

The disposition of the air intake- and air exhaust roofs previously described for the front walls 21 also applies for the rear wall 22 with the same viewing direction.

As illustrated in FIG. 2*b*, based on the indicated material flow 7, said arrangement has the effect that each of the material flows 7 moving through the dryer chute 1 from the top to the bottom, wherein said material flows are generated by the separation effect of the air roofs 2 and 3, are impacted on their flow path in an alternating manner once from the left side and once from the right side from a respective air intake roof 2 with drying air 15, and that in spite of this at no place of the material flow 7 an over proportional accumulation of air intake roofs 2 or air exhaust roofs 3 occurs, which immediately has a detrimental local effect, like an immediate detrimental local effect like increase of the temperature of the drying material or increased pressure drop.

In order to further improve the evenness of the drying of the material to be dried over the cross section of a material flow 7, a flow separation can be accomplished in a very simple manner and without additional product inverters, and thus without additional flow resistance and risk of constipation by providing an additional lateral offset 9 by a fraction of the width 8 of the material flow 7 at one or several locations in the vertical, preferably at the transition from one module to the next, so that the diagonal lines 5, 6 comprise a lateral offset at this location.

Figure 2C:
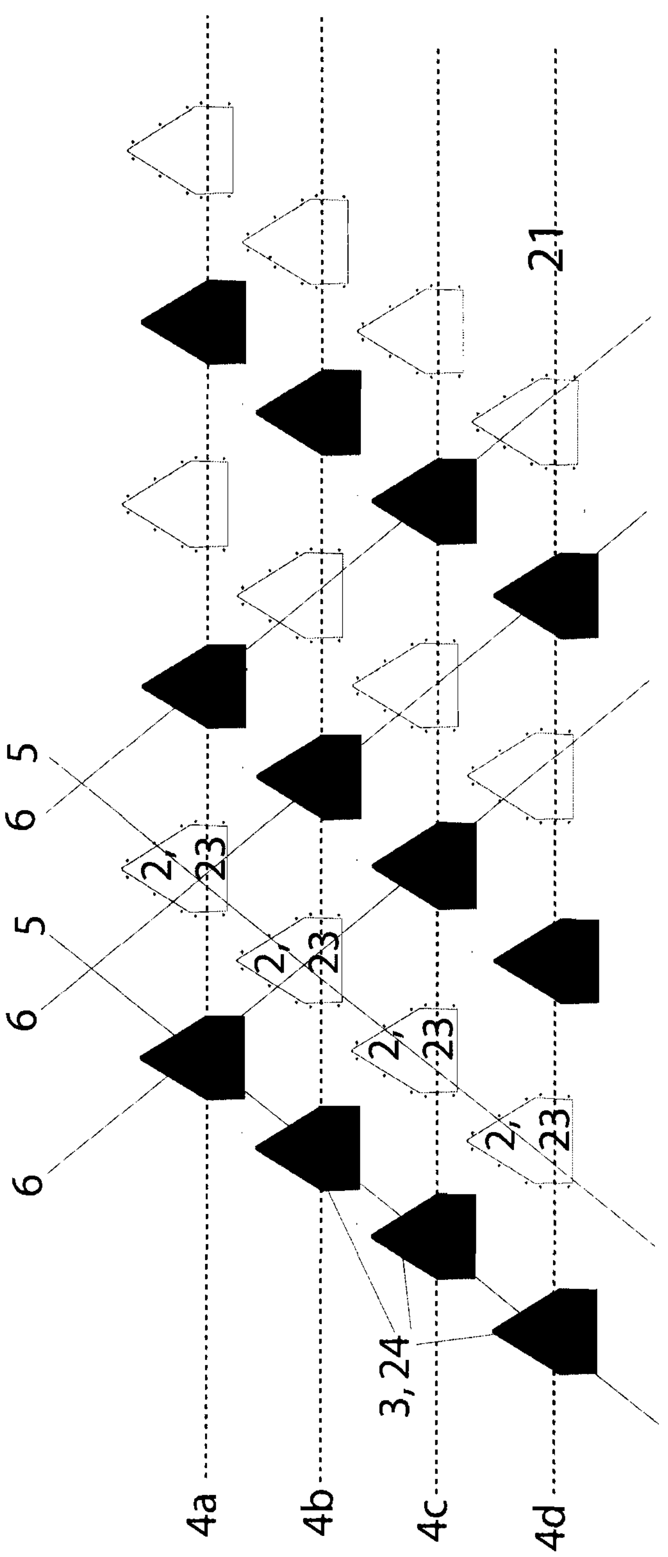
Figure 2D:
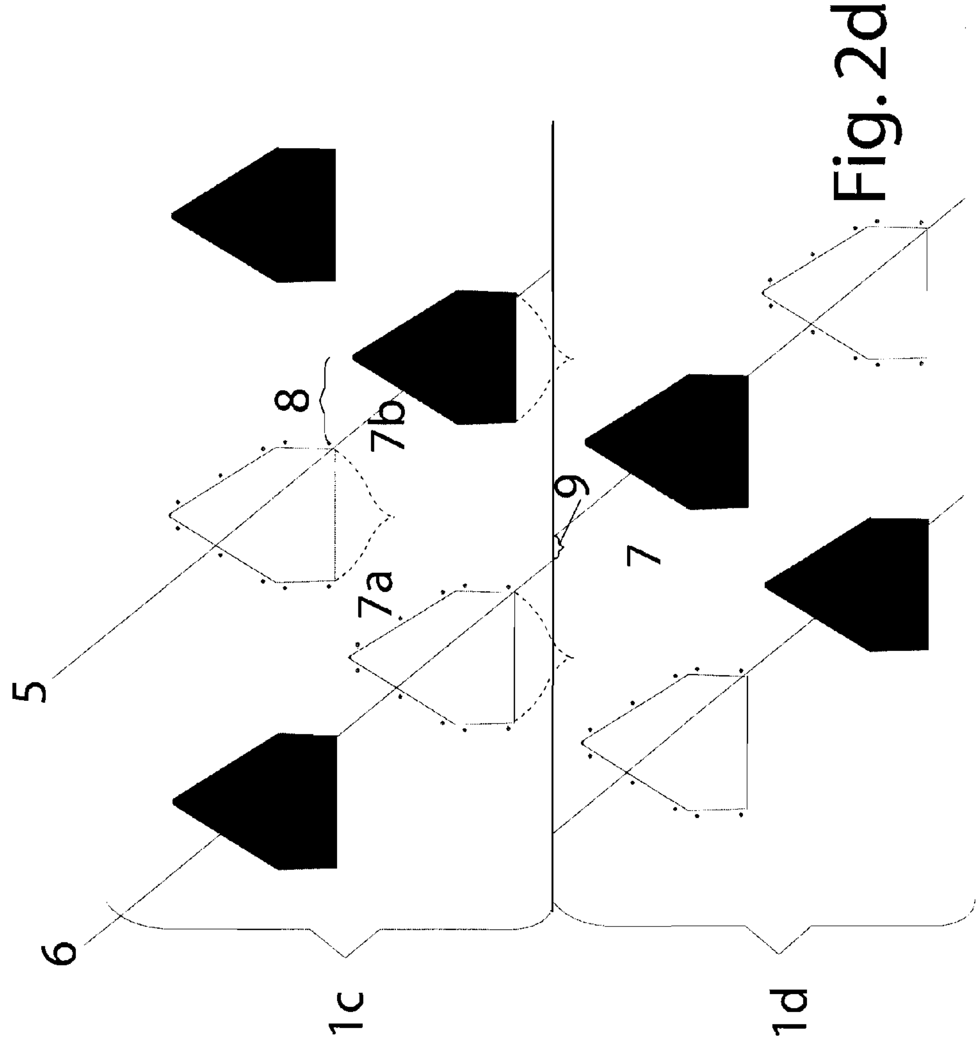

In FIG. 2*d*, this is illustrated without an offset at the transition between the modules 1*c* and 1*d* in comparison to FIG. 2*c*.

Thus, in the front wall 21' of the module 1*d*, the disposition of the pass-through openings 23 and of the hole patterns 24 relative to one another is the same as in the hole pattern walls 21 of the remaining modules, however, it is offset in lateral direction overall by half the width 8 of a product flow 7, thus by a quarter of the internal distance between two adjacent roofs (air intake roof 2 and air exhaust roof 3), so that hereby at the transition from the module 1*c* to the module 1*d*, each material flow 7 is divided, in this case cut in half, into two partial flows 7*a*, 7*b*.

At the beginning of the module 1*d*, two adjacent partial flows 7*b*, a, which initially were components of various material flows 7, are combined into a new material flow 7'.

Thus, the portions of the drying material, which were positioned in the center of the material flow in the old material flow 7, are positioned in the exterior rim portions of the material flow 7', which now balances drying- or temperature differences, which may have previously existed over the cross section of the material flow.

When such flow separation is performed several times over the height of the chute dryer 1, preferably not only respectively by cutting the material flow in half, but also by splitting it into smaller fragments, like e.g. a third or a quarter, this yields an optimum even drying.

The advantage of dividing the material flow 7 into halves as illustrated in FIG. 2*c* is, that only two respective types of front walls 21 and 21' are required over the height of the chute dryer 1 and accordingly also only two types of rear walls 22, 22' are required, even when such flow separation is performed multiple times in sequence over the height of the chute dryer 1.

Since the components of such a chute dryer 1 most of the time have to be transported over large distances to the installation site, and only have to be assembled there, among other things, a small space requirement during the transport to the installation site is important.

Thus, the air roofs, which are typically identically configured as air intake roofs 2 and air exhaust roofs 3, comprise a cross section, which decreases from the open face to the closed face, according to the air flow increasing at air exhaust roofs towards the open face.

Figure 3A:
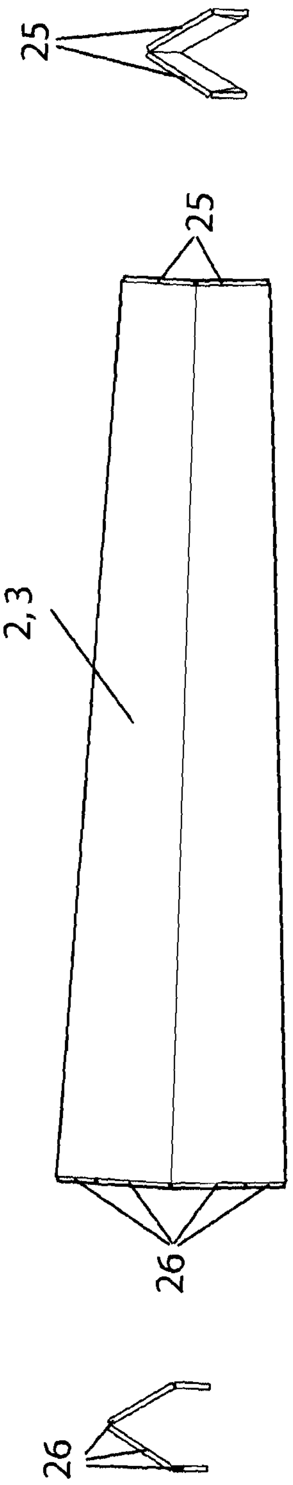

The FIG. 3 show such an air roof 2, 3 in detail. FIG. 3*a* shows it in a flat projection view with the two subsequent front face chamfers 25, 26 for mounting at the front walls 21 and rear walls 22 of the dryer chute 1.

Figure 3B:
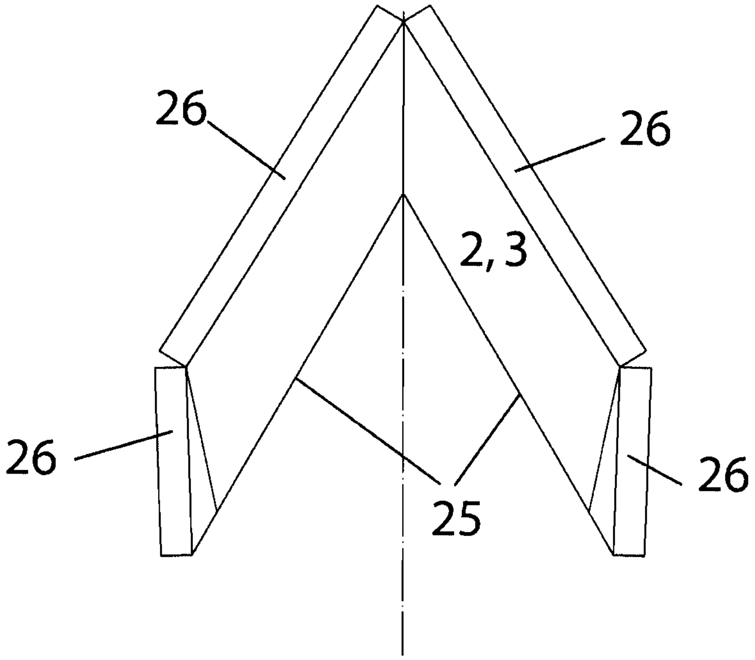
Figure 3C:
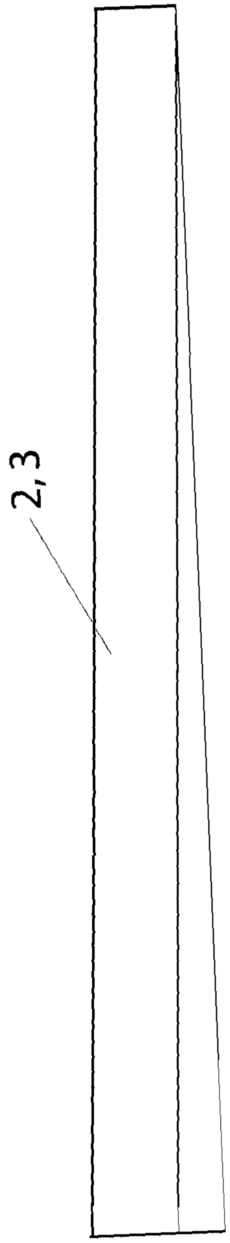

It is evident, on the one hand that the height of the roof 2, 3 according to FIG. 3*c* continuously decreases towards a front face, thus the roof ridge constitutes a straight inclined line in lateral view, and also the lower opening width preferably decreases in said direction to a certain extent.

Thus, the conically tapered roof can be produced by straight chamfers from a flat sheet metal blank, as it is evident in the flat projection view of FIG. 3*a*.

The detailed face illustrations in FIG. 3*a* and also the front face view of the finished roof 2, 3 from the side with the small cross section in FIG. 3*b*, thus the side which is closed in assembled state, furthermore show in which direction the chamfers 25, 26, which are used for bolting to the walls 21, 22 of the dryer chute 1, are manufactured.

By the chamfers 25, 26 being disposed at the two face ends at one end to the outside and on the other end to the inside, and thus at the preferably face side end with the smaller cross section to the inside, and at the end with the greater cross section to the outside, the air roofs thus produced and chamfered can be stacked on top of one another in a simple manner in a relatively large number, and thus a great number of air roofs can be transported with the smallest transport volume. This is important in view of the fact that such an air roof 2, 3 is several meters long, and already in an average chute dryer 1, 200 air roofs or more may be required.

Figure 4C:
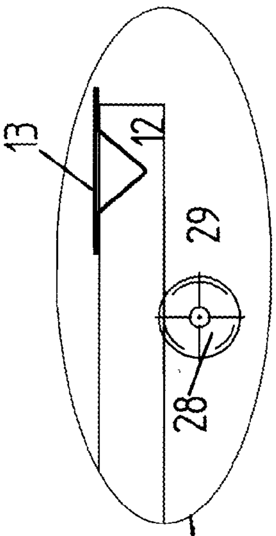
Figure 4A:
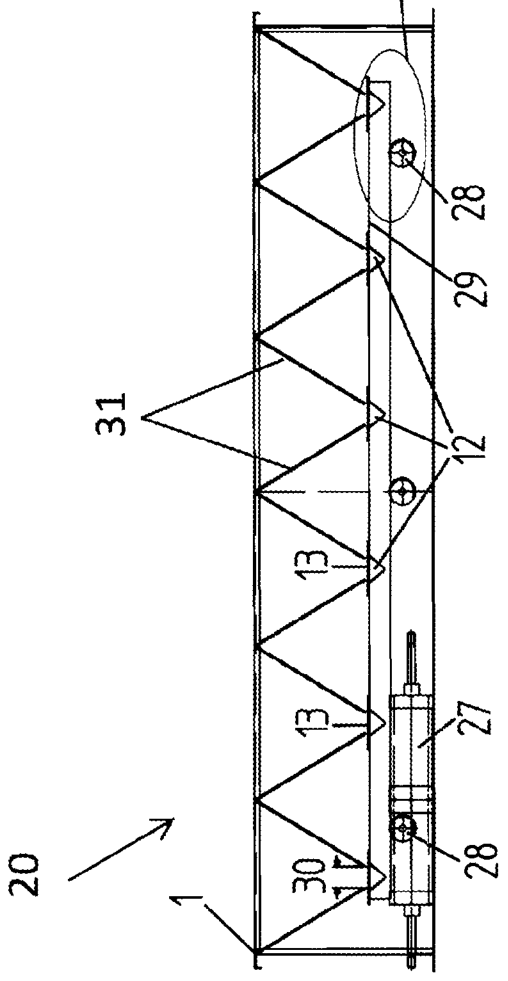
Figure 4B:
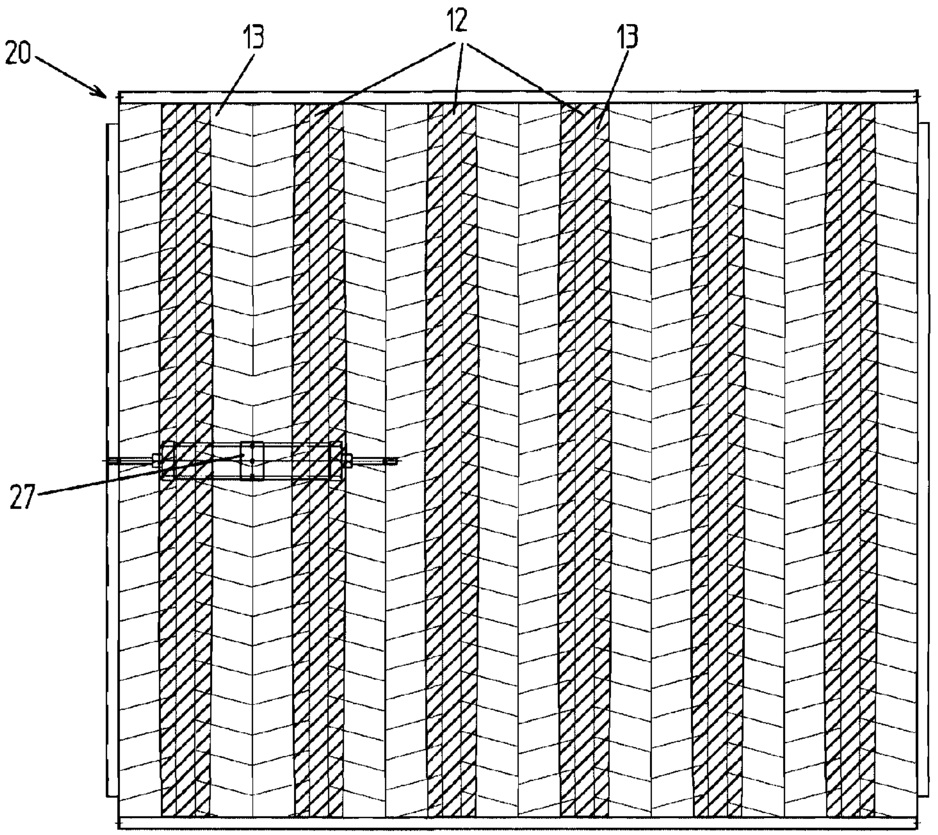

Another design detail is shown in the exhaust unit 20, which is illustrated in FIG. 4, which is shown in FIG. 4*a* in lateral view, in FIG. 4*c* a detail thereof is shown, and in FIG. 4*b* it is shown in top view.

Thus, it is evident in the side view of FIG. 4*a*, that below the dryer chute 1 respective line shaped grooves with V-shaped cross section are linked together, in whose bottom in turn stripe shaped run-out openings 30 are disposed, from which the dried material can be released.

The exhaust openings 30 can be completely closed by exhaust slides 12, which are also stripe shaped, which are in turn V-shaped in lateral view for reasons of stability, but which are covered by a cover plate 13, which is slightly convex in upward direction, onto which the drying material presses in the closed state of the exhaust openings 30.

As it is evident from FIG. 4*a*, there is a small gap between the lower end of the feed walls 31, extending at a slant in downward direction, and the upper side of the cover plates 13, through which the drying material, however, cannot flow out in lateral direction, since the cover plate 13 extends in closed condition to both sides far enough beyond the lateral end of the exhaust opening 30.

All exhaust slides 12 including their cover plates 13 are connected at their front face ends by longitudinal beams to form an exhaust frame 29, wherein said longitudinal beams extend in opening direction of the exhaust slides 12 in the lateral view of FIG. 4*a* to the left or to the right, wherein said exhaust frame can be moved to the left or to the right by an actuation cylinder 27 in the FIG. 4, so that the exhaust openings 30 are closed or partially opened.

A complete opening, so that the cover plates 13 completely move out of the portion of the exhaust openings 30 is thus not desired.

Thus, if the exhaust opening 30 is opened completely, the product column, which rests directly above the outlet opening 30, would run through the outlet opening very quickly, while the product portions, which rests above the slanted feed walls 31, would only run to the exhaust opening 30 very slowly or not at all. Thus, an even run out from the dryer chute 1 would not be assured.

Instead, the exhaust slides 12 with the cover sheets 13 are only moved to the side together and thus alternatively to the left and to the right side, so that the run out opening 30 only opens partially.

In combination with the fact, that the cover plates 13 are slightly convex in upward direction, viewed in longitudinal direction as shown in FIG. 4*c*, this causes an even flow into the open portion of the run out openings 30 of those portions of the material which abut to the feed walls 31, and also of those portions of the material which are disposed above the uncovered run out opening 30.

REFERENCE NUMERALS AND DESIGNATIONS

1 dryer chute
1*a, b* module
2 air intake roof
2*a* closed face
2*b* open face
3 air exhaust roof
3*a* closed face
3*b* open face
4*a, b* plane
5 diagonal line
6 diagonal line
7 material flow
8 material flow width
9 additional offset
10 flow direction
11 transversal direction
12 exhaust slide
13 cover plate
14 covering
15 drying air
16 intake air manifold module
17 exhaust air manifold module
18 hot air generator
19 exhaust air fan
20 run out unit
21 front wall
22 rear wall
23 pass-through opening
24 hole pattern
25 chamfer
26 chamfer
27 actuation cylinder
28 rollers
29 run out frame
30 run out opening
31 feed walls

What is claimed is:

1. A bulk material dryer, comprising:

a vertical dryer chute including plural modules placed above one another; and a plurality of air intake roofs and air exhaust roofs disposed inside the vertical dryer chute in parallel and horizontally aligned, wherein the air intake roofs and air exhaust roofs are disposed in plural planes above one another, wherein the roofs are disposed offset in face view in the planes, so that a rhomboid pattern with only diagonally extending gridlines is formed, wherein the air intake roofs and the air exhaust roofs are respectively disposed on diagonal lines, wherein only one type of the air intake roofs or the air exhaust roofs is disposed on the diagonal lines of one direction, and both types of the air intake roofs and the air exhaust roofs are disposed in an alternating manner on the diagonal lines of the other direction, wherein the air intake roofs and the air exhaust roofs of a particular type are arranged offset towards a same side in at least one plane relative to another of the air intake roofs or the air exhaust roofs of the same type disposed above, and wherein the offset is provided in a transversal direction by an additional offset which corresponds to a fraction of a material flow width.

2. The bulk material dryer according to claim 1, wherein on the diagonal lines of the other direction the two types of air roofs are disposed in a continuously alternating manner.

3. The bulk material dryer according to claim 1, wherein the air intake roofs and the air exhaust roofs are each open on the bottom and comprises an open face and a closed face, wherein a cross section of each of the air intake roofs and air exhaust roofs increases from the closed face to the open face in both types of air roofs.

4. The bulk material chute dryer according to claim 1, wherein the modules comprise an even number of planes with air roofs on top of one another.

5. The bulk material dryer according to claim 1, wherein the modules are disposed on top of one another in a respectively identical orientation, wherein the air roofs of the highest plane respectively open towards the same side, thus towards the air intake side or towards the air exhaust side.

6. The bulk material dryer according to claim 1, wherein in the particular planes, air intake roofs and air exhaust roofs alternate evenly.

7. The bulk material dryer according to claim 1, wherein the air roofs of the respective same type are disposed vertically exactly above one another.

8. The bulk material dryer according to claim 1, wherein in at least one plane the air roofs of a certain type are all disposed, relative to the next above disposed air roofs of the same type in the fourth next plane above.

9. The bulk material dryer according to claim 1, wherein the additional offset is provided several times over the height of the dryer and always in the same direction, and the sum of the additional offsets approximately yields the material flow width.

10. The bulk material dryer according to claim 1, wherein the additional offset for the air roofs of a module remains constant relative to the air roofs of the subsequent modules disposed above or below.

11. The bulk material dryer according to claim 1, wherein heat recovery is performed from the drying air after it has flowed through bulk material and before it is exhausted to the ambient.

12. The bulk material dryer according to claim 1, wherein sweat zones without roofs are provided, and drying air with reduced heating is supplied by air intake roofs to a pass-through air cooler disposed below a sweat zone.

13. A method for drying bulk material in a vertical dryer chute, in which a plurality air intake roofs and air exhaust roofs, are disposed, which extend transversally through the dryer chute, and wherein the bulk material moves towards a run out from the top to the bottom, and wherein the bulk material is divided by the air roofs into adjacent material flows, the air intake roofs and the air exhaust roofs of a particular type are arranged offset towards a same side in at least one plane relative to another of the air intake roofs or the air exhaust roofs of the same type disposed above, the offset is provided in a transversal direction by an additional offset which corresponds to a fraction of a material flow width, wherein the particular material flows are thus flowed through by drying air in an alternating manner from the right to the left, and from the left to the right on their path from the top to the bottom, and the drying air, which is supplied from the air intake roofs of a first horizontal plane is always supplied to air exhaust roofs, which are disposed in a second horizontal plane, located directly above or below the first horizontal plane, except in the uppermost or lowermost first horizontal plane.

14. A method for drying bulk material in a vertical dryer chute, in which a plurality air intake roofs and air exhaust roofs, are disposed, which extend transversally through the dryer chute, wherein the bulk material moves towards a run out from the top to the bottom, and wherein the bulk material is divided by the air roofs into adjacent material flows, the air intake roofs and the air exhaust roofs of a particular type are arranged offset towards a same side in at least one plane relative to another of the air intake roofs or the air exhaust roofs of the same type disposed above, the offset is provided in a transversal direction by an additional offset which corresponds to a fraction of a material flow width, wherein the material flows on their way downward are additionally divided once or several times, and the partial flows thus created are combined into a new material flow, and said flow partitioning and recombination is only caused by positioning the air roofs, which are provided.

15. The method according to claim 13, wherein the drying is performed in several stages by several chute dryers in series and a tempering of the product is performed there between by at least one pass-through cooler.

16. The method according to claim 13, wherein the tempering and cooling in the last stage is performed in one or several tower shaped chutes with a run out at the bottom side, and with a cooling in the lower portion by air intake- and air exhaust elements extending through the tower shaped chute by means of ambient air which has not been heated.

17. The method according to claim 14, wherein the drying is performed in several stages by several chute dryers in series and a tempering of the product is performed there between by at least one pass-through cooler.

18. The method according to claim 14, wherein tempering and cooling in the last stage is performed in one or several tower shaped chutes with a run out at the bottom side, and with a cooling in the lower portion by air intake- and air exhaust elements extending in transversal.

19. The bulk material dryer according to claim 1, wherein on the diagonal lines of the other direction the two types of air roofs are disposed in a continuously alternating manner so that one of the air exhaust roofs follows directly after each one of the air intake roofs and vice versa.

20. The bulk material dryer according to claim 1, wherein the air roofs of the respective same type are disposed vertically exactly above one another, in the respectively fourth next plane.

21. The bulk material dryer according to claim 1, wherein the additional offset of the fraction of the material flow width is by half a material flow width, towards the same side.

* * * * *